April 28, 1970 A. TEMPS, JR 3,508,392

TELEPHONE CLOCK

Filed Feb. 20, 1967

INVENTOR.
Alfred J. Temps Jr.

United States Patent Office 3,508,392
Patented Apr. 28, 1970

3,508,392
TELEPHONE CLOCK
Alfred Temps, Jr., 114 Beach Road, Massapequa, N.Y. 11758
Filed Feb. 20, 1967, Ser. No. 621,392
Int. Cl. G04b *15/20*
U.S. Cl. 58—145 1 Claim

ABSTRACT OF THE DISCLOSURE

This invention relates to means for recording the duration of outgoing telephone calls from a dial type telephone receiver. This telephone clock mechanism is completely external to the telephone receiver electrical circuits. It is activated and appropriately deactivated solely by the mechanical operations performed by a user in the placing of a telephone call and subsequently in the termination of a telephone call. In particular, the motions normally associated with the external telephone dial and the receiver hook in the placing and terminating of a call are used to trip switches which activate and deactivate the telephone clock mechanism.

Figures 1, 2, 3, 4:
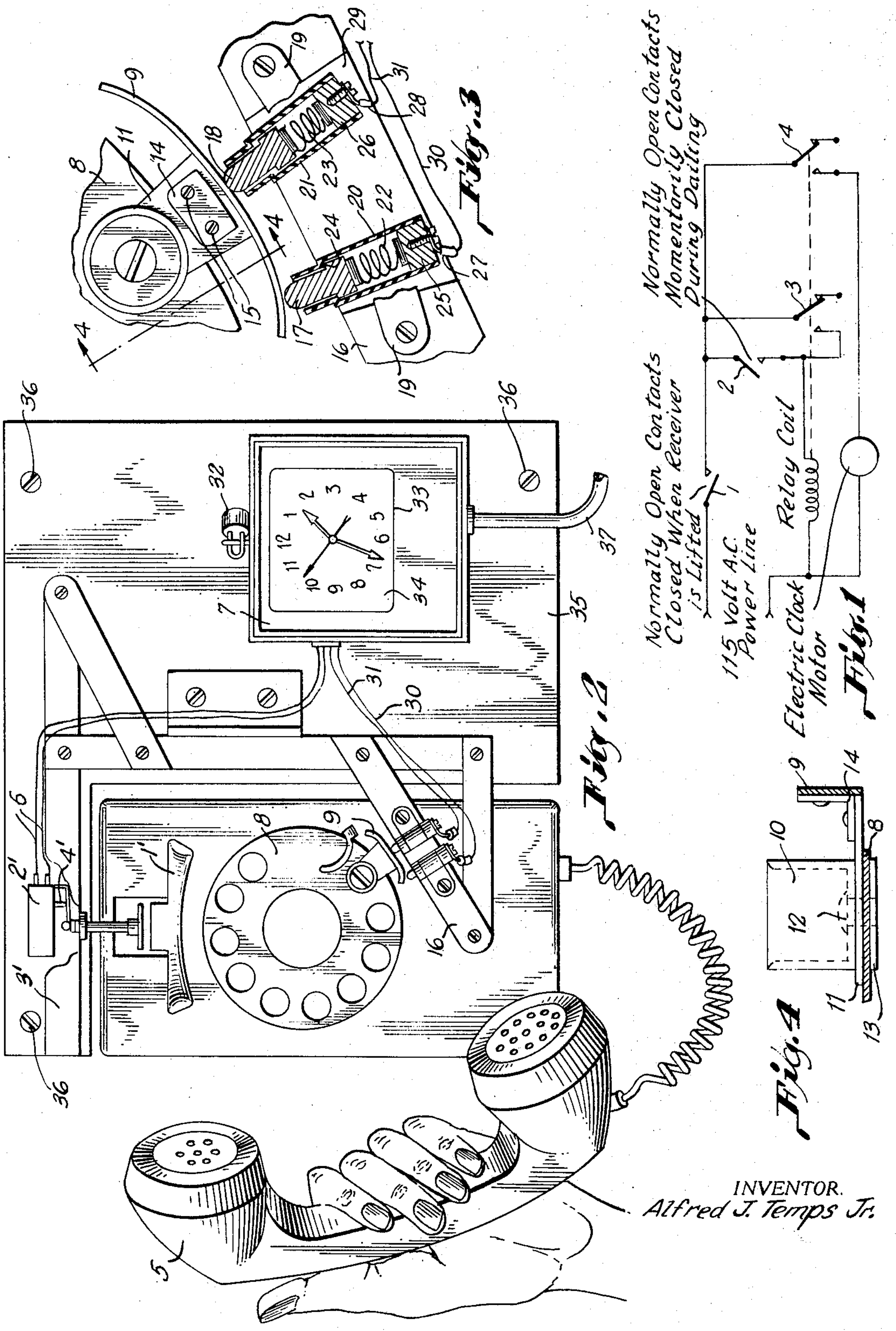

Means for recording the duration of outgoing telephone calls from a dial type telephone receiver is disclosed, which is completely external to the telephone receiver electrical circuits. It is activated and appropriately deactivated solely by the mechanical operations performed by the user in the placing of a telephone call and subsequently in the termination of a telephone call. In particular, the motions normally associated with the external telephone dial and the receiver hook in the placing and terminating of a call are used to trip switches which activate and deactivate the telephone clock mechanism.

The device herein described is called a "telephone clock." Its purpose is to help people who have their own phones to predict, be knowledgeable of, and check phone calls made during the course of the billing period (typically once each month) of the telephone company. A running account of time spent on the phone for outgoing calls is provided the user through a simple, economical mechanism which in no manner defaces the telephone and is located entirely outside the telephone mechanism.

The only calls billedat a particular telephone without record are outgoing calls. The basic telephone clock described herein records, without any intent to be exceedingly accurate, the duration of outgoing calls. More specifically it records the totality of time spent on a phone from the initiation of the dialing procedure to the time the receiver is hung up, for as many times as this procedure is repeated, before the unit is reset. Experience has shown that, despite the fact that the above recording makes no allowance for dialing time, busy signals, no answer calls, and long distance calls, such a method gives a remarkably accurate accounting of calls over an extended period of time, taking inherent advantage of the averaging out of call-to-call discrepancies.

The operator performs one mechanical operation upon receiving a telephone call (that of lifting up the receiver) and more than one (that of lifting up the receiver and dialing or pushing buttons) upon sending a telephone call. The telephone clock uses this fact in recording only outgoing call time. The basic parts of the telephone clock as proposed herein consist of an electric clock mechanism, a relay, a pair of switches and various support elements, associated wiring and packaging embellishments. For the telephone clock model described, the electric clock is caused to run during outgoing calls (i.e. when the operations of lifting up the receiver and dialing both are performed) and does not run when calls are received (when only the lifting of the receiver is performed). The expired time can be recorded and the clock (timer) reset every month, or the times recorded at intervals depending upon how the user wishes to employ the device.

Descriptive illustrations of the telephone clock are shown in FIGURES 1 through 4. FIGURE 1 shows an electrical schematic illustrative of the logic embodied in the operation of the device. FIGURE 2 shows a representative telephone clock mechanism as mounted to a wall telephone. FIGURES 3 and 4 show details of the dial actuated switch associated with the telephone clock embodiment of FIGURE 2.

SPECIFIC EMBODIMENT OF TELEPHONE CLOCK

Description of first reduction to practice

A working telephone clock has been built and is shown in FIGURES 1 and 2. FIGURE 1 shows the electric schematic. When the receiver is lifted from the hook, normally open contacts 1 are closed and remain closed until the telephone receiver is replaced on the phone. At this point in the operating sequence normally open contacts 2, 3, and 4 are opened and nothing further transspires as would be the case for received calls.

If an outgoing call is attempted, normally open contacts 2 are momentarily closed during the dialing experience thus energizing the relay coil. Before contact 2 reopens, relay contacts 3 have closed thus holding the relay coil in the energized position. The energized relay coil closes normally open contacts 4 thus activating the electric clock motor and setting the clock in motion. The clock keeps running until the receiver is hung up which opens the contacts 1 thereby deenergizing the relay coil and returning the circuit to the state shown in FIGURE 1.

If the clock setting is known at the first of the month, for example, the elapsed time for outgoing calls at any time during the month can be told at a glance. This enables the user to budget his telephone time effectively.

FIGURE 2 shows a particular embodiment of the telephone clock as adapted to a wall phone. In the vicinity of the receiver support hook 1, a sensitive switch 2 such as, for example, a low actuating force microswitch is mounted on support bracket 3' in such a manner that the support hook 1' causes microswitch plunger 4' to be pushed upward upon removal of the receiver 5. Insulated wires 6 are connected to the common and normally open contacts of the microswitch 2' and run along support bracket 3' into circuit compartment 7. Mounted along the periphery of the telephone dial 8 is a metal bus 9 which will rotate with the dial 8. FIGURE 3 shows an enlarged detail of the dial actuated switching assembly which can be affixed to the telephone without damaging it or permanently altering its appearance.

FIGURE 4 illustrates the means employed for fastening the bus 9 to the telephone dial 8. A thimble type shape 10 alternately a post not shown, is clamped with support bar 11 to the telephone dial 8 by screw 12 which threads into clamping plate 13, located directly below the dial 8. Support bracket 14 which is fastened to support bar 11 by screw 15 is the means for holding conducting bus 9 in position. Supported (by brackets 16) so as to make contact during the act of dialing the telephone with the conducting bus 9 is a pair of metal pistons 17–18 rounded at the ends and supported in clamped 19 cylindrical holders 20 and held within by retaining springs 22, 23. Note that in the position of the dial 8 shown in FIGURE 3, piston 17 is not making contact with bus 9 and is held by ridge 24 while piston 18 is making electrical contact with bus 9 and is held slightly depressed in its cylindrical holder 21 by bus 9. Press fitted metallic inserts, 25, 26 and retaining springs 22, 23 provide the means for making electrical contact between metal pistons 17, 18 and screw fastened terminals 27, 28. Good electrical contact is insured by retaining springs 22, 23 in much the same way as carbon brushes are held in electric motors. Metal parts are insulated from support bracket 16 by insulating spacer 29. In operation, when the dial 8 is rotated, metallic bus 9 momentarily makes contact with both metal pistons 17, 18 causing momentary electrical contact to exist between otherwise insulated wires 30, 31.

In FIGURE 2, wires 30, 31 from the dial actuated switch mechanism are run into the electrical compartment 7 where they are connected as normally open contacts 2 in FIGURE 1. Circuit compartment 7 consists of a metal box with a hinged back and means for locking 32. It also contains the wiring, relay and its mounting and cutout 33 for the electrical clock 34 (alternatively an electric timer). Wiring for the circuitry is in accordance with FIGURE 1 and mountings within the circuit compartment 7 are sturdy and in accord with good mechanical and electrical design. The clock 34 is positioned in a manner such that it can be reset only with the locks unlocked thus enabling the hinged back to be opened. The entirety of telephone clock parts are mounted on support plate 35 which is rigidly fixed to the wall adjacent to the telephone by fastening screws 36 so that mechanical support parts are immobile with respect to the telephone. Electric power is fed into the electrical compartment 7 via wires 37 which are permanently connected to a convenient power source (not shown).

What is claimed is:

1. A telephone time recording mechanism with means provided for recording outgoing telephone call durations made with a dial type telephone, consisting of an electric switch mechanically linked to the telephone receiver hook which is closed when the receiver hook is lifted; an electric switch affixed to the telephone dial in such a manner that this switch is momentarily closed during the dialing process by the user of the telephone with a portion of this momentary switch being supported in proper relation to the portion affixed to the dial in order to achieve the desired momentary operating time; said switches used in conjunction to activate a switching device with hold-in contacts with respect to the momentary contacting of the dialing associated switch and series dependent on the state of the switch linked to the receiver hook, said switching device being used to activate a time recording device after having been activated in the sequence of picking up the telephone receiver hook and dialing the telephone, also being used to deactivate said time recording device when the receiver hook is replaced in its static non-operating position on the telephone.

References Cited

UNITED STATES PATENTS

| | | | |
|---|---|---|---|
| 558,167 | 4/1896 | Field | 179—7 XR |
| 597,003 | 1/1898 | Kosanke | 179—7 XR |
| 673,072 | 4/1901 | Bliss | 58—145 |
| 838,115 | 12/1906 | Holland | 179—7 |
| 2,229,308 | 1/1941 | Recker | 235—91.5 XR |
| 2,350,177 | 5/1944 | MacKen | 58—145 XR |
| 2,609,045 | 9/1952 | Kaiser | 58—145 |
| 2,935,679 | 5/1960 | Morton. | |

RICHARD B. WILKINSON, Primary Examiner

E. C. SIMMONS, Assistant Examiner

U.S. Cl. X.R.

58—152; 179—7